US008836816B2

(12) United States Patent
Lukac

(10) Patent No.: US 8,836,816 B2
(45) Date of Patent: Sep. 16, 2014

(54) METHOD OF ADJUSTING THE BRIGHTNESS OF A DIGITAL CAMERA IMAGE

(75) Inventor: Rastislav Lukac, San Jose, CA (US)

(73) Assignee: Foveon, Inc., Santa Clara, CA (US)

( * ) Notice: Subject to any disclaimer, the term of this patent is extended or adjusted under 35 U.S.C. 154(b) by 212 days.

(21) Appl. No.: 13/467,264

(22) Filed: May 9, 2012

(65) Prior Publication Data

US 2012/0293688 A1 Nov. 22, 2012

Related U.S. Application Data

(60) Provisional application No. 61/487,902, filed on May 19, 2011.

(51) Int. Cl.
*H04N 5/235* (2006.01)
*H04N 5/228* (2006.01)
*G03B 7/00* (2014.01)
*H04N 9/68* (2006.01)

(52) U.S. Cl.
CPC ..................................... *H04N 5/235* (2013.01)
USPC .................. 348/230.1; 348/221.1; 348/222.1; 348/229.1; 348/362; 348/234

(58) Field of Classification Search
CPC ... H04N 5/2355; H04N 5/2351; H04N 5/235; H04N 5/243; H04N 5/2353; H04N 5/217; H04N 5/2354; G01J 1/18
USPC ............ 348/294–324, 221.1–230.1, 234–238
See application file for complete search history.

(56) References Cited

U.S. PATENT DOCUMENTS

| 8,115,849 | B2 * | 2/2012 | Kinugasa | 348/308 |
|---|---|---|---|---|
| 8,115,857 | B2 * | 2/2012 | Kuniba | 348/362 |
| 8,237,809 | B2 * | 8/2012 | Mertens | 348/222.1 |
| 8,289,430 | B2 * | 10/2012 | Bechtel et al. | 348/308 |
| 8,355,059 | B2 * | 1/2013 | Fukui | 348/229.1 |
| 2007/0009253 | A1 * | 1/2007 | Nikkanen et al. | 396/234 |
| 2008/0187235 | A1 * | 8/2008 | Wakazono et al. | 382/255 |
| 2009/0244329 | A1 * | 10/2009 | Kuniba | 348/241 |
| 2010/0039547 | A1 * | 2/2010 | Kinugasa | 348/308 |
| 2010/0165135 | A1 * | 7/2010 | Kalevo | 348/221.1 |
| 2010/0201843 | A1 * | 8/2010 | Fukui | 348/229.1 |
| 2010/0253833 | A1 * | 10/2010 | Deever et al. | 348/362 |
| 2011/0149111 | A1 * | 6/2011 | Prentice et al. | 348/229.1 |
| 2011/0216210 | A1 * | 9/2011 | Hao | 348/222.1 |
| 2011/0317992 | A1 * | 12/2011 | Takeshita | 396/213 |
| 2012/0002899 | A1 * | 1/2012 | Orr et al. | 382/282 |
| 2012/0007989 | A1 * | 1/2012 | Numata | 348/164 |
| 2012/0008015 | A1 * | 1/2012 | Manabe | 348/234 |
| 2012/0113291 | A1 * | 5/2012 | Kinugasa | 348/222.1 |
| 2012/0300105 | A1 * | 11/2012 | Deever et al. | 348/302 |
| 2012/0314095 | A1 * | 12/2012 | Fukui | 348/220.1 |

* cited by examiner

*Primary Examiner* — Chia-Wei A Chen
(74) *Attorney, Agent, or Firm* — The Webb Law Firm

(57) ABSTRACT

A method for adjusting the brightness of a captured image from a digital camera includes calculating a reference exposure value using the capture parameters and calculating an actual exposure value as a function of ambient illumination parameters. The reference exposure and actual exposure values are compared to determine an actual image saturation value. The actual image saturation value is compared with the saturation value of the image sensor to determine a brightness adjustment factor, and the captured image is adjusted to compensate for overexposure or underexposure in response to the brightness adjustment factor. The image is scaled up or down using the brightness adjustment factor if the actual image saturation value is less than or more than the saturation value of the image sensor used to capture the image.

21 Claims, 3 Drawing Sheets

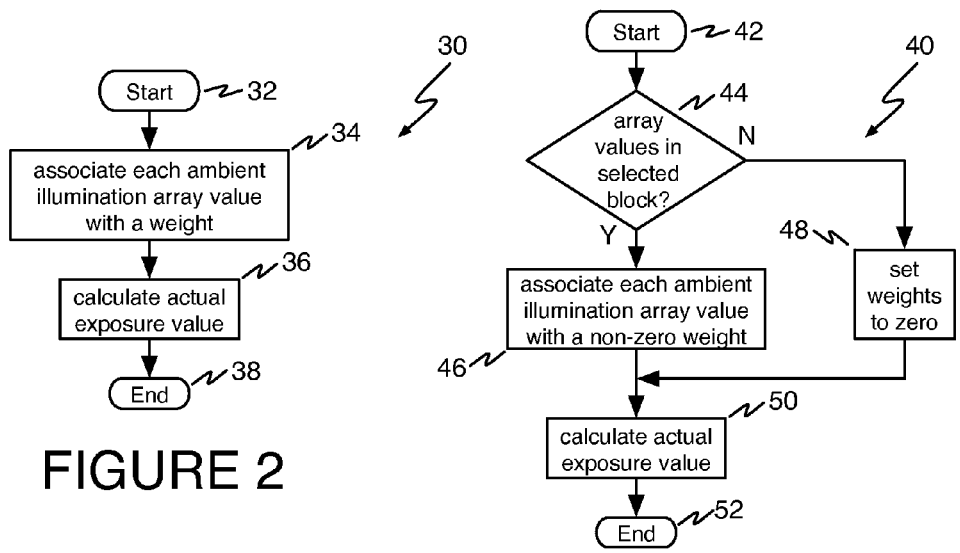
FIGURE 2
FIGURE 3
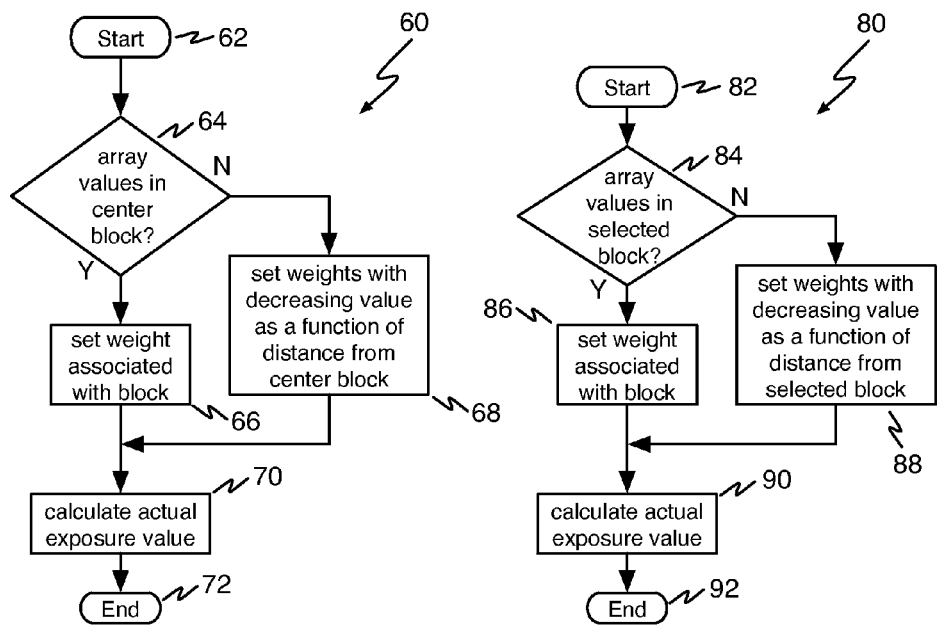
FIGURE 4
FIGURE 5

METHOD OF ADJUSTING THE BRIGHTNESS OF A DIGITAL CAMERA IMAGE

CROSS-REFERENCE TO RELATED APPLICATIONS

This application claims the benefit of U.S. Provisional Patent Application Ser. No. 61/487,902, filed May 19, 2011, the entirety of which is incorporated by reference herein.

BACKGROUND

1. Field of the Invention

The present invention relates to processing of digital images. More particularly, the present invention relates to methods for adjusting the brightness of a digital camera image using capture parameters and information about ambient illumination.

2. The Prior Art

The most common way of adjusting the brightness of camera-captured images is to use image statistics extracted from the image to be adjusted. Unfortunately, such techniques may fail in complex scenes such as scenes with high-dynamic range and scenes with varying illumination. Moreover, due to the large number of pixels and the complexity of relevant algorithms it is also common that such techniques are slow, computationally complex, and have high memory requirements. Therefore, a different approach is needed.

BRIEF DESCRIPTION

The present invention comprises methods for performing exposure or brightness adjustment in a digital image using digital camera capture parameters and information about ambient illumination.

According to a first aspect of the present invention, a method for adjusting the brightness of a captured image from a digital camera includes calculating a reference exposure value using the capture parameters and calculating an actual exposure value as a function of the parameters characterizing ambient illumination. The reference exposure value and the actual exposure value are compared to determine an actual image saturation value. The actual image saturation value is compared with the saturation value of the image sensor used to capture the image to determine a brightness adjustment factor, and the captured image is adjusted to compensate for one of overexposure and underexposure in response to the brightness adjustment factor value. This adjustment process includes scaling the image up using the brightness adjustment factor if the actual image saturation value is less than the saturation value of the image sensor used to capture the image, and scaling the image down using the brightness adjustment factor if the actual image saturation value is more than the saturation value of the image sensor used to capture the image.

BRIEF DESCRIPTION OF THE DRAWING FIGURES

FIGS. 2 through 7 are flow diagrams depicting illustrative embodiments of the present invention for weighting actual exposure values.

DETAILED DESCRIPTION

Persons of ordinary skill in the art will realize that the following description of the present invention is illustrative only and not in any way limiting. Other embodiments of the invention will readily suggest themselves to such skilled persons.

To compensate for possible overexposure or underexposure of a scene by a digital camera, for example, due to an incorrect capture parameter setting entered by the user or an incorrect automatic setting in the camera, the method of the present invention compares the exposure value calculated using the capture parameters and the exposure value calculated using the parameters characterizing ambient illumination. The present invention is not limited to the specific examples presented below.

Figure 1:
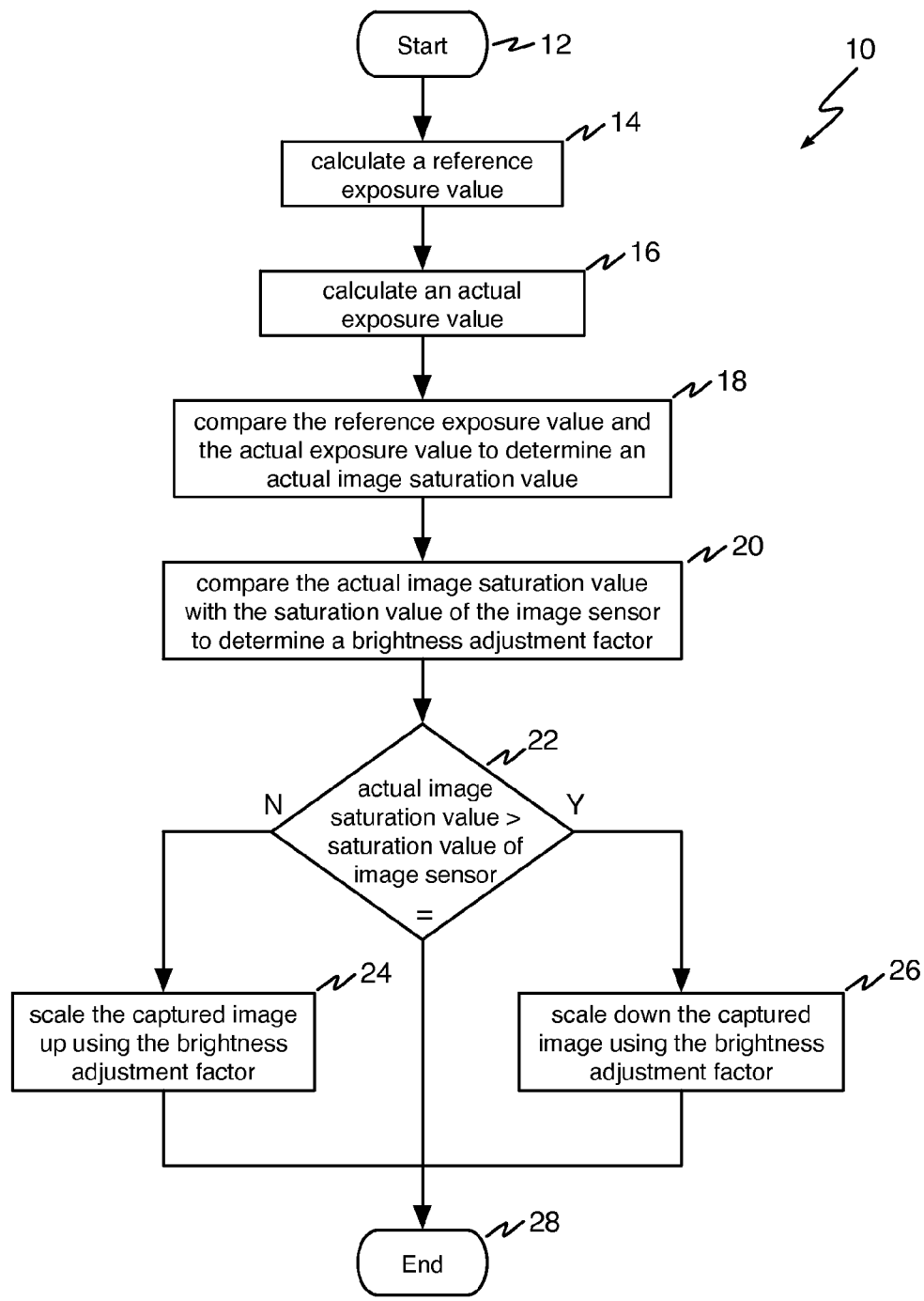
FIG. 1 is a flow diagram depicting an illustrative embodiment of the present invention.

Referring first to FIG. 1, a flow diagram shows an illustrative method 10 according to one aspect of the present invention for compensating for possible overexposure or underexposure of a scene by a digital camera. The process starts at reference numeral 12. At reference numeral 14a reference exposure value is calculated using the capture parameters. At reference numeral 16 an actual exposure value is calculated as a function of the parameters characterizing ambient illumination.

At reference numeral 18, the reference exposure value and the actual exposure value are compared to determine an actual image saturation value. At reference numeral 20 the actual image saturation value is compared with the saturation value of the image sensor used to capture the image to determine a brightness adjustment factor.

At reference numeral 22 it is determined whether the actual image saturation value from the captured image differs from the saturation value of the image sensor. If the actual image saturation value from the captured image is smaller than the saturation value of the image sensor, then the image is underexposed and the captured image is scaled up at reference numeral 24 using the brightness adjustment factor. If the actual image saturation value from the captured image is larger than the saturation value of the image sensor, then the image is overexposed and the captured image is scaled down at reference numeral 26 using the brightness adjustment factor. If the actual image saturation value from the captured image is equal to the saturation value of the image sensor, then the image is considered to be correctly exposed and no brightness adjustment is required. The process ends at reference numeral 28.

The reference exposure value is calculated using the capture parameters. In one example solution, the reference exposure value $EV_{ref}$ is calculated as follows:

$$EV_{ref} = \log_2(A^2/t) - \log_2(I/100) \qquad (1)$$

where A refers to the aperture, t refers to the shutter speed, and I refers to the ISO setting.

The actual exposure value is calculated as a function of the parameters characterizing ambient illumination. Such parameters are usually arranged in an array, with each array value corresponding to a block in a captured image. The actual exposure value calculation can match the camera metering mode, such as evaluative, spot, center area, and center weighted average.

Alternative solutions can combine ambient illumination array values in an arbitrary way. The above-mentioned example solutions can be generalized by associating each ambient illumination array value with a weight, resulting in the weighted average-like calculations of the actual exposure value $EV_{act}$, as follows:

$$EV_{act} = T\left(\left(\sum_{i=1}^{N} w_i \alpha_i\right) \bigg/ \sum_{i=1}^{N} w_i\right) \quad (2)$$

where N denotes the total number of available ambient illumination values, and $w_i$ is the weight (usually with a nonnegative value) associated with the ambient illumination value $\alpha_i$. The function $T(\bullet)$ denotes the relationship between the camera exposure value (or the response of the image sensor) and $\alpha_i$ values (or ambient illumination sensor response), this function is usually determined in the camera calibration phase. For example, the function $T(\bullet)$ can be defined as $T(x) = (x-48)/8+5$.

Referring now to FIG. 2, a general method 30 for assigning weights is illustrated as a flow diagram. The process starts at reference numeral 32. At reference numeral 34 each ambient illumination array value is associated with a weight. At reference numeral 36, the actual exposure value is calculated from the ambient illumination array values and their weights. The process ends at reference numeral 38.

In the exemplary embodiment shown in FIG. 2, all the weights can be set to the same value to obtain the average ambient illumination value. In another exemplary embodiment, the weights associated with $\alpha_i$ values corresponding to blocks in focus (either indicated by the camera or automatically detected using the captured image data) are set to one or generally to the same nonzero value, whereas all other weights are set to zero or some nonzero values smaller than the weights associated with the $\alpha_i$ corresponding to blocks in focus. In yet another exemplary embodiment, only the weight associated with the image block of interest (for example, as determined via spot metering or selected by the user in the camera menu or through PC interface) is to set to a nonzero value.

Referring now to FIG. 3 a method 40 for assigning weights is illustrated as a flow diagram. The process begins at reference numeral 42. At reference numeral 44 it is determined whether the ambient illumination array values being processed are in the selected block. As noted, this block may be a block in focus, a block determined by spot metering or selected by a user via the camera or an external interface such as a PC.

At reference numeral 46, if the ambient illumination array values being examined are contained in the selected block, each ambient illumination value in the array is associated with a nonzero weight. At reference numeral 48, if the ambient illumination array values being examined are not contained in the selected block, the weight for each ambient illumination value in the array is set to zero. At reference numeral 50 the actual exposure value is calculated. The process ends at reference numeral 52.

In another exemplary embodiment, (e.g., corresponding to the center area and center weighted averaging modes) the weight value is reduced with the increasing distance from the sensor center. A method 60 implementing this embodiment of the invention is illustrated in the flow diagram of FIG. 4. The process begins at reference numeral 62. At reference numeral 64 it is determined whether the array values being processed are in the selected center block.

At reference numeral 66, if the array values being examined are contained in a block associated with the center of the imager, each ambient illumination value in the array is associated with a nonzero weight. At reference numeral 68, if the array values being examined are not contained in the block associated with the center of the imager, the weight for each such ambient illumination value is set to a value decreasing as a function of distance from the center of the imager. The decreasing function may have different forms; examples include, but are not limited to, weights inversely proportional to the distance from the center of the image and weights obtained using the Gaussian function. At reference numeral 70 the actual exposure value is calculated. The process ends at reference numeral 72.

In another exemplary embodiment, the weight value is reduced with the increasing distance from a selected image block of interest. A method 80 implementing this embodiment of the invention is illustrated in the flow diagram of FIG. 5. The process begins at reference numeral 82. At reference numeral 84 it is determined whether the array values being processed are in the selected block of interest.

At reference numeral 86, if the array values being examined are contained in a block associated with the portion of the image at the selected block, each ambient illumination value in the array is associated with a weight. At reference numeral 88, if the array values being examined are not contained in the block associated with the portion of the image at the selected block, the weight for each such ambient illumination value is set to a value decreasing as a function of distance from the selected block. The decreasing function may have different forms; examples include, but are not limited to, weights inversely proportional to the distance from the center of the selected block, weights obtained using the Gaussian function, and weights obtained using various thresholding functions. At reference numeral 90 the actual exposure value is calculated. The process ends at reference numeral 92.

In yet another exemplary embodiment, nonzero weight(s) are associated with the samples close to a target ambient illumination value, for instance either predetermined or calculated using an arbitrary function (for example, median, maximum, minimum, average of maximum and minimum, etc.) of the acquired ambient illumination values.

Figure 6:
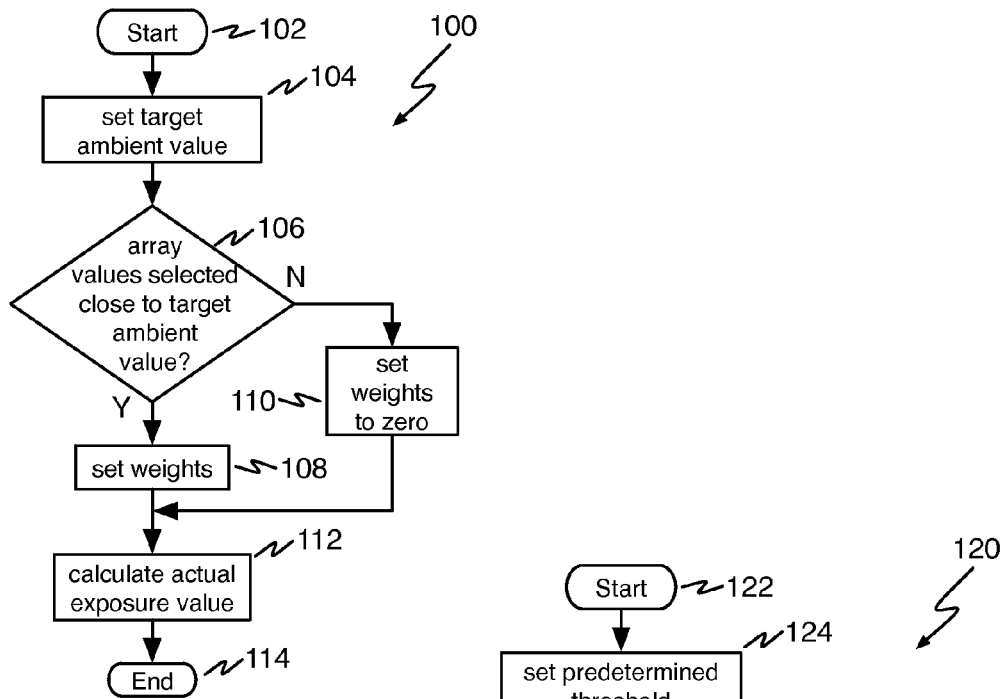

A method 100 implementing this embodiment of the invention is illustrated in the flow diagram of FIG. 6. The process begins at reference numeral 102. At reference numeral 104 a target ambient illumination value is set. The target ambient illumination value may be set as a predetermined or calculated using an arbitrary function as previously noted. At reference numeral 106 it is determined whether the array values being processed are close in value to the target ambient illumination value (i.e., within certain range of the target ambient illumination value; the range being expressed as a percentage of the target ambient illumination value or specified as a difference from the target ambient illumination value).

At reference numeral 108, if the array values being examined are close in value to the target ambient illumination value, each ambient illumination value in the array is associated with a weight. At reference numeral 110, if the array values being examined are not close in value to the target ambient illumination value, the weights for these ambient illumination values in the array are set to zero. At reference numeral 112 the actual exposure value is calculated. The process ends at reference numeral 114.

In yet another example, the weight values or the captured $\alpha_i$ values can be compared to a predetermined threshold in order to set the weights to zero for those weights or $\alpha_i$ values which fall below the predetermined thresholding criterion.

Figure 7:
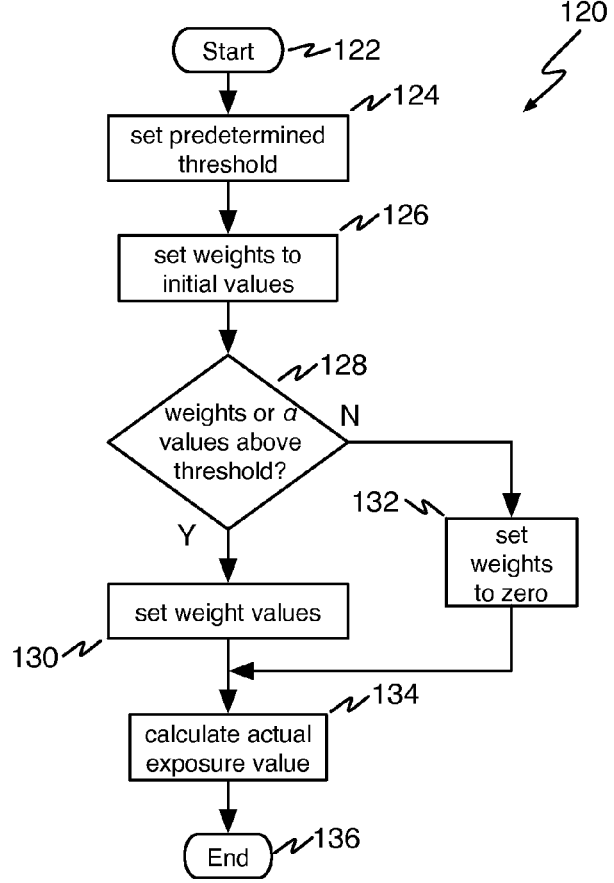

A method 120 implementing this embodiment of the invention is illustrated in the flow diagram of FIG. 7. The process begins at reference numeral 122. At reference numeral 124 a predetermined threshold is set. At reference numeral 126, initial weight values are set for each ambient illumination value in the array. The initial weights may be set by any function, such as the functions disclosed herein.

At reference numeral 128, it is determined whether the initially-set weights are above the weight predetermined threshold. At reference numeral 130, the weight values are set to the initially set values for all ambient illumination values in the array having initially-set weights above the predetermined weight threshold. At reference numeral 132, the weight values are set to zero for all ambient illumination values in the array having initially-set weights below the predetermined weight threshold. At reference numeral 134 the actual exposure value is calculated. The process ends at reference numeral 136.

It should be noted that the present invention allows combining various methods for setting the weights. For example, the weights can be expressed as the decreasing function of the absolute difference from the target ambient illumination value. The decreasing function may have different forms; examples include, but are not limited to, weights inversely proportional to the absolute or square distance of ambient illumination array values from the target ambient value, weights obtained using the Gaussian function, and weights obtained using various thresholding functions. It is also possible to combine the weights derived as a function of the distance of the blocks associated with these weights from the selected block of interest and the weights derived as a function of the difference between ambient illumination array values associated with these weights and the target ambient illumination value.

Once both the reference exposure value $EV_{ref}$ and the actual reference value $EV_{act}$ are determined, the method of the present invention determines the level of underexposure or overexposure by comparing $EV_{ref}$ and $EV_{act}$, calculating the actual image saturation value Sat. An arbitrary function $f(\bullet)$ can be used to perform this task, as follows:

$$Sat=f(EV_{ref},EV_{act},\beta) \quad (3)$$

where $\beta$ denotes the image sensor saturation value, for example, 4095 for a sensor operating with a 12-bit analog-to-digital converter. Advanced solutions can be defined as follows:

$$Sat=f(EV_{ref},EV_{act},\beta,p_1,p_2,\ldots) \quad (4)$$

where $p_1, p_2, \ldots$ are additional capture or predetermined parameters, such as capture parameters indicating the deviation from the optimal exposure, flash parameters, etc.

In one example, the actual image saturation value can be calculated as follows:

$$Sat=2^{(EV_{ref}-EV_{act})sign}\beta \quad (5)$$

where the sign term denotes a parameter set to 1 or 1 during calibration.

In another example, the actual image saturation value can be calculated as follows:

$$Sat=\left(\frac{EV_{ref}}{EV_{act}}\right)^{sign}\beta \quad (6)$$

In yet another example, the actual image saturation value can be calculated as follows:

$$Sat=\begin{cases} 2^{((EV_{ref}-EV_{act})sign-E+H)}\beta & \text{if } E>H \\ 2^{((EV_{ref}-EV_{act})sign-E+L)}\beta & \text{if } E<L \\ 2^{(EV_{ref}-EV_{act})sign}\beta & \text{otherwise} \end{cases} \quad (7)$$

where E denotes the exposure deviation (for example, as determined by the camera during the image capture process) from the optimal exposure and H and L are tunable or predetermined parameters.

In another example solution, the actual image saturation value Sat can be calculated as follows:

$$Sat=\beta \text{ if}(EV_{ref}-EV_{act})sign>\Delta \quad (8)$$

whereas in yet another example $$Sat=\beta \text{ if}(EV_{ref}-EV_{act})sign>\Delta \text{ and } EV_{act}<\eta, \quad (9)$$

where $\Delta$ and $\eta$ are predetermined parameters.

Once the actual image saturation value Sat is determined, the captured image can be adjusted to compensate for the possible over or under exposure.

In a simplest form, the image should be scaled with the ratio of the actual image saturation value Sat and the image sensor saturation value $\beta$. This is similar to scaling the image range prior to mapping it to the output range. If Sat>$\beta$, then the image is overexposed and the image clipping point (usually set by default to $\beta$) should be scaled up by Sat/$\beta$ (or $\gamma$Sat/$\beta$ where $\gamma$ is a headroom adjustment parameter) to avoid clipping the image information during the processing or when converting the image into the output image range. If Sat<$\beta$, then the image is underexposed and the image clipping point should be scaled down by Sat/$\beta$ (or $\gamma$Sat/$\beta$) to avoid producing too dark image.

More advanced solutions can use Sat or $\gamma$Sat as the image clipping point or the maximum input value in a look-up-table used to perform gamma correction and/or tone curve mapping. Note that the clipping can be implemented as img=min (img, Sat) or img=min(img,$\gamma$Sat) where img refers to the image to be adjusted or compensated for overexposure or underexposure.

In yet another example, it is also possible to use Sat to adjust the camera capture parameters prior taking the final image with optimally determined exposure.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for adjusting the brightness of a captured image from a digital camera, comprising:
    calculating a reference exposure value using the capture parameters;
    calculating an actual exposure value as a function of the parameters characterizing ambient illumination;

comparing the reference exposure value and the actual exposure value to determine an actual image saturation value;

comparing the actual image saturation value with the saturation value of the image sensor used to capture the image to determine a brightness adjustment factor;

wherein determining the brightness adjustment factor includes providing a headroom adjustment parameter to avoid clipping the image information during processing or when converting the image into an output image range; and adjusting the captured image to compensate for one of overexposure and underexposure in response to the brightness adjustment factor.

2. The method of claim 1 wherein adjusting the captured image to compensate for one of overexposure and underexposure in response to the brightness adjustment factor comprises:

scaling the image up using the brightness adjustment factor if the actual image saturation value is less than the saturation value of the image sensor used to capture the image; and scaling the image down using the brightness adjustment factor if the actual image saturation value is more than the saturation value of the image sensor used to capture the image.

3. The method of claim 1 wherein calculating the actual exposure value comprises calculating the actual exposure value to match a metering mode in the camera.

4. The method of claim 1 wherein calculating the actual exposure value comprises calculating the actual exposure value as the function of at least one parameter characterizing ambient illumination.

5. The method of claim 4 wherein calculating the actual exposure value as the function of at least one parameter characterizing ambient illumination comprises evaluating an array of values characterizing ambient illumination corresponding to a block in the captured image.

6. The method of claim 5 wherein evaluating an array of values characterizing ambient illumination comprises associating each ambient illumination array value with a weight, to produce weighted average-like calculations of the actual exposure value.

7. The method of claim 6, wherein associating each ambient illumination array value with the weight comprises setting all the weights to the same value to obtain the average ambient illumination value.

8. The method of claim 6, wherein associating each ambient illumination array value with the weight comprises setting only the weights associated with blocks in focus, either indicated by the camera or automatically detected using the captured image data, to a nonzero value.

9. The method of claim 6, wherein associating each ambient illumination array value with the weight comprises setting only the weight associated with one or more image blocks of interest to the nonzero value.

10. The method of claim 9, wherein setting only the weight associated with an image block of interest to the nonzero value comprises setting an image block of interest as determined via spot metering to the nonzero value.

11. The method of claim 9, wherein setting only the weight associated with an image block of interest to the nonzero value comprises setting an image block of interest selected by the user in the camera menu to the nonzero value.

12. The method of claim 9, wherein setting only the weight associated with an image block of interest to the nonzero value comprises setting an image block of interest selected by the user through PC interface to a nonzero value.

13. The method of claim 6, wherein associating each ambient illumination array value with the weight comprises setting weight values decreasing as a function of increasing distance from the image block of interest.

14. The method of claim 6, wherein associating each ambient illumination array value with the weight comprises setting weight values decreasing as a function of increasing distance from the center of the image.

15. The method of claim 6, wherein associating each ambient illumination array value with the weight comprises setting the weight associated with an image block having values close to a target ambient illumination value.

16. The method of claim 15, wherein setting the weight associated with an image block having values close to the target ambient illumination value comprises setting the weight values associated with image blocks having values close to a predetermined target ambient illumination value.

17. The method of claim 15, wherein setting the weight associated with an image block having values close to the target ambient illumination value comprises setting the weight values associated with image blocks having values calculated using an arbitrary function.

18. The method of claim 17 wherein the arbitrary function is one of median, maximum-minimum, average, average of maximum and minimum of acquired ambient illumination values.

19. The method of claim 6, wherein setting the weight associated with an image block comprises: comparing one of the weight values and captured ambient illumination values to a predetermined threshold; and setting to zero those weights or captured ambient illumination values which fall below the predetermined threshold.

20. The method of claim 6, wherein setting the weight associated with an image block having values close to the target ambient illumination value comprises setting weights associated with image blocks decreasing as a function of increasing difference from the target ambient illumination value.

21. The method of claim 6, wherein setting the weight associated with an image block having values close to a target ambient illumination value comprises combining the weight values decreasing as a function of increasing difference from the target ambient illumination value and the weight values decreasing as a function of increasing distance from the image block of interest.

* * * * *